(12) United States Patent
Goodman

(10) Patent No.: US 6,446,789 B1
(45) Date of Patent: Sep. 10, 2002

(54) VACUUM TRANSFER DEVICE

(75) Inventor: James A. Goodman, Glencoe, IL (US)

(73) Assignee: Prototype Equipment Corporation, Waukegan, IL (US)

( * ) Notice: Subject to any disclaimer, the term of this patent is extended or adjusted under 35 U.S.C. 154(b) by 94 days.

(21) Appl. No.: 09/677,393

(22) Filed: Sep. 29, 2000

(51) Int. Cl.[7] .............................................. B65G 13/02
(52) U.S. Cl. .............................. 198/689.1; 198/457.03; 198/457.01
(58) Field of Search ....................... 198/689.1, 457.03, 198/457.01

(56) References Cited

U.S. PATENT DOCUMENTS

| | | | |
|---|---|---|---|
| 3,889,801 A | * 6/1975 | Boyer | 198/689.1 |
| 4,627,608 A | 12/1986 | Harms | |
| 5,295,586 A | 3/1994 | Chesnutt et al. | |
| 5,373,933 A | * 12/1994 | Planke et al. | 198/689.1 |
| 5,819,907 A | * 10/1998 | Simkowski | 198/689.1 |
| 5,850,725 A | 12/1998 | Chalendar | |
| 5,887,699 A | 3/1999 | Tharpe | |
| 5,927,465 A | 7/1999 | Shearer, Jr. | |
| 5,944,171 A | 8/1999 | Vertogen et al. | |
| 6,227,541 B1 | * 5/2001 | Couillard et al. | 198/408 |

FOREIGN PATENT DOCUMENTS

| | | | |
|---|---|---|---|
| EP | 132150 A2 | * 1/1985 | |
| EP | 491168 A1 | * 11/1991 | B65G/15/58 |

* cited by examiner

Primary Examiner—Christopher P. Ellis
Assistant Examiner—Richard Ridley
(74) Attorney, Agent, or Firm—Brinks Hofer Gilson & Lione

(57) ABSTRACT

A conveyor mechanism for transferring an article from a primary conveyor to a secondary conveyor that extends in a direction normal to the direction of the primary conveyor. The secondary conveyor has a receiving location at which it receives articles from the first conveyor. The second conveyor has a flat support surface over which a perforated continuous conveyor belt extends. A vacuum plenum is inlayed into the flat support surface and has openings in its upper plate that are located at the receiving location. A vacuum source is connected to the vacuum plenum for creating a vacuum in the vacuum plenum that pulls air through the perforated continuous conveyor belt which causes objects that are deposited on the secondary conveyor at the receiving location to be pulled to and held against the upper surface of the perforated continuous conveyor belt.

8 Claims, 1 Drawing Sheet

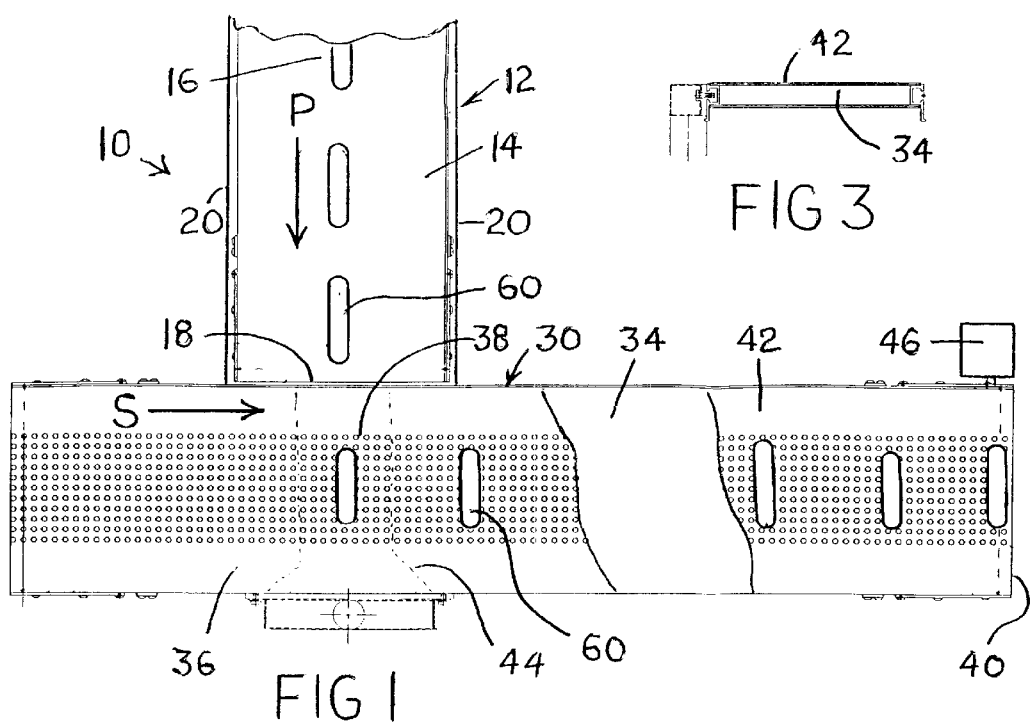
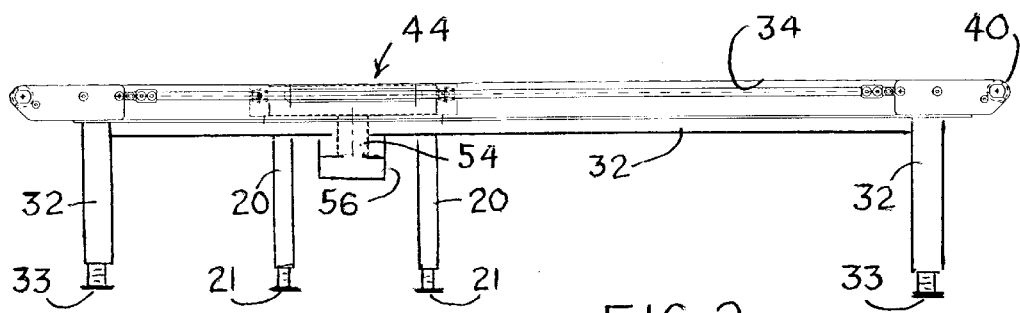
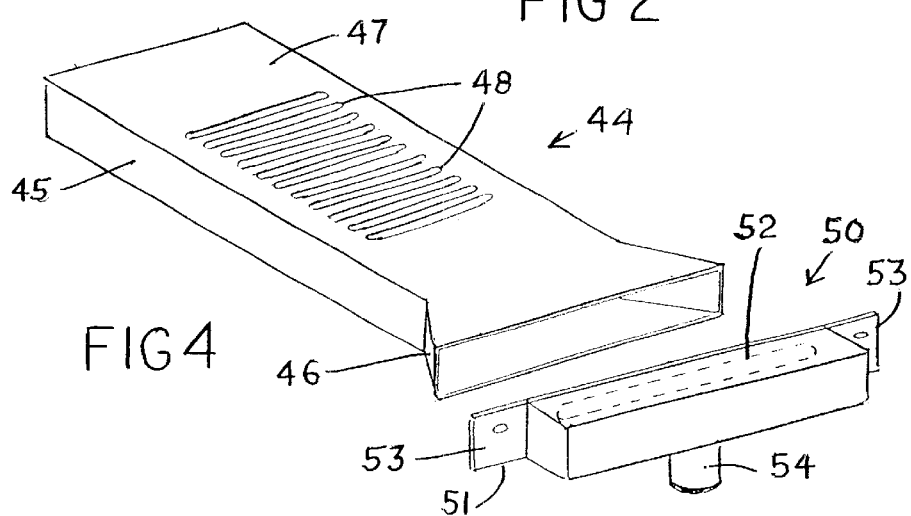

VACUUM TRANSFER DEVICE

BACKGROUND OF THE INVENTION

This invention relates generally to a conveyor transfer system and, more particularly, to a method and mechanism for transferring objects from a primary conveyor to a secondary conveyor that is moving in a direction normal to the direction of the primary conveyor. The prior art includes a wide variety of techniques and mechanisms for transferring an article being transferred along a primary conveyor to a secondary conveyor that is moving in a different direction, usually in a direction that is normal to the transfer direction of the primary conveyor. For example, in U.S. Pat. No. 5,887,699, articles are transferred from a primary conveyor to a secondary conveyor by a rotating mechanism that includes an extending arm that is mounted for rotation and operated by a hydraulic cylinder such that a portion of the article extends across the side of the primary conveyor and is frictionally engaged by the secondary conveyor. Another example of a prior art conveyor diverting system is shown in U.S. Pat. No. 5,927,465 that utilizes a pair of diverting tracks and diverting gates that are moved into position to divert articles that are to be directed to the secondary conveyor. Generally, the prior art devices include structural mechanism such as turning devices, arms for rotating the articles and pivoting mechanism for re-orienting the articles to be transferred to the secondary conveyor. These prior art devices depend upon the article and the structural mechanism engaging in a predetermined way and are susceptible to malfunctioning if the size or shape of the article changes or the article is not orientated on the primary conveyor as anticipated. Also, the diverting arms, turning devices and pivoting mechanisms are, since they are exposed, vulnerable to being bent, broken or twisted, thus rendering them inoperative for their intended purpose. Furthermore, the diverting mechanisms are susceptible to wear and, when worn, they malfunction. The prior art devices are also complex, occupy considerable space, clutter and obstruct the conveyor area and are expensive to produce and maintain. Furthermore, many of the prior art devices are designed for specific articles and cannot be relied upon to function satisfactorily with other articles. As a result, there is a need for a simple, compact, reliable, adaptable and inexpensive mechanism for transferring articles from a primary conveyor to a secondary conveyor that extends at an angle to the primary conveyor.

BRIEF SUMMARY OF THE INVENTION

This principal object of this invention is to provide a method and mechanism for transferring an article being conveyed along a primary conveyor to a secondary conveyor that extends normal to said primary conveyor in a manner that overcomes the above discussed shortcomings of the prior art. To accomplish this, Applicant has provided a primary conveyor for conveying individual objects in a first direction toward its discharge end and a secondary conveyor for receiving objects at a receiving location from said discharge end of the first conveyor. The secondary conveyor then conveys the individual objects in a direction that is at an angle to said first direction. The first and secondary conveyors are arranged with respect to each other such that, when the conveyed objects reach the discharge end of said first conveyor, they are deposited on the receiving location of said second conveyor. The second conveyor has a flat support surface over which a perforated continuous conveyor belt extends. A vacuum plenum, having a flat upper surface, is inlayed in the flat support surface such that its flat upper surface lies in the plane of the flat support surface. There are slotted openings formed in the flat upper surface of the vacuum plenum. A vacuum source is connected to the vacuum plenum for creating a vacuum in said plenum that pulls air through the perforated continuous conveyor belt that moves over the flat support surface. The vacuum causes objects that are deposited on the secondary conveyor at the receiving location to be pulled to and held against the upper surface of the perforated continuous conveyor belt. The vacuum is sufficiently strong to stop the movement of the objects in the direction of the primary conveyor and to hold the objects against the upper surface the of perforated continuous conveyor belt. Once the movement of an object in the direction of the primary conveyor has been stopped, the object is conveyed along the second conveyor without the need for a vacuum to hold it against the upper surface of the perforated continuous conveyor. In accordance with Applicant's invention, there are no external arms, trays or diverters that can be bent or broken and, thus, disable the transfer mechanism. Applicant's mechanism provides for a positive transfer from the primary to the secondary conveyor that can be adjusted for objects of various sizes and weights by merely changing the level of the vacuum.

BRIEF DESCRIPTION OF SEVERAL VIEWS OF THE DRAWINGS

FIG. 1 is a plan view of two conveyors that intersect at a right angle.

FIG. 2 is a side view of the conveyor seen in FIG. 1 that is receiving conveyed objects from the other conveyor seen in FIG. 1.

FIG. 3 is an end view of the conveyor seen in FIG. 2.

FIG. 4 is an isolated perspective view of the vacuum mechanism used in this invention.

DETAILED DESCRIPTION OF THE INVENTION

Referring now to the drawings and the specific embodiment of the invention illustrated therein, a plan view of the conveyor apparatus 10 is shown in FIG. 1. A primary or first conveyor 12 has a flat conveying surface 14 along which objects 60 are conveyed in the direction indicated by the arrow P. As illustrated, the conveyor 12 is a belt conveyor but it should be understood that conveyor 12 could be any conventional type of conveyor, such as a belt or chain conveyor. The objects 60 thus are conveyed along the upper surface of conveyor 12 from the entrance end 16 toward the discharge end 18. As best seen in FIG. 2, the primary or first conveyor 12 is supported by a frame 20 at a desired elevation above the ground. The frame 20 includes adjustable ground engaging feet 21 for the purpose of precisely adjusting and leveling the conveyor 12.

An objective of this transfer system is to position the objects 60 on the secondary conveyor 30 with their longitudinal dimension normal to the direction of travel of conveyor 30 with the objects 60 parallel to each and spaced from each other by a minimum spacing. To accomplish this the width of the object 60 and the rate at which the objects are being deposited on primary conveyor 12 are factors that must be considered in establishing the conveying speeds for both conveyors 12 and 30.

A secondary conveyor 30, see FIG. 1, is arranged normal to the direction of feed primary conveyor 12. It should be noted that this invention is not limited to the illustrated embodiment in which the primary and secondary conveyors are normal to each other, and will work equally well if the conveyors extend more or less than ninety degrees relative to each other. As best seen in FIG. 2, the secondary conveyor 30 is supported by a frame 32 at a desired elevation above the ground. The frame 32 includes adjustable ground engaging feet 33 for the purpose of precisely adjusting and leveling the conveyor 12. In the preferred embodiment, the support surface of secondary conveyor 30 is adjusted such that it is slightly lower than the conveying surface of primary conveyor 12.

The secondary conveyor 30 includes a flat stationary support surface 34 that extends the length of the conveyor. The upper rung of a perforated continuous conveyor belt 42 is supported by the stationary support surface 34. The perforated continuous conveyor belt 42 wraps around a roller at each end of the conveyor, one of which is driven by a drive mechanism 46. The drive mechanism 46 drives the belt 42 in the direction indicated by the arrow S such that the upper band rung moves from the receiving end 36, past the receiving location 38 and than on to the discharge end 40.

The primary conveyor 12 discharges the conveyed objects 60 to the receiving location 38 of the secondary conveyor 30. The flat stationary support surface 34 of the secondary conveyor has a portion cut away into which is inlayed a hollow or vacuum plenum or open ended chamber 44. The hollow chamber 44 is shown in an isolated view in FIG. 4. The hollow chamber 44 includes a rectangular portion 45 and an open flared end portion 46. The upper plate 47 of the hollow chamber 44 has a plurality of open slots 48 formed therein. The hollow chamber 44 is inlayed in the flat stationary support surface 34 such that its upper plate 47 is in the plane of the flat stationary support surface 34 with the slots 48 extending in the direction of movement of the perforated continuous belt 42. A head portion 50 for the hollow chamber 44 is secured to the side of the conveyor 30 such that the open flared end 46 is closed. The head portion 50 includes a back plate 51 having a slot 52 formed therein that permits communication between the hollow chamber 44 and the interior of the head portion 50. The back plate 51 includes a tab 53 on each side that are used to secure the head portion 50 to the side of the conveyor 30. A tube 54 is secured to the bottom of the head portion 50 such that the tube 54 communicates with the interior of the head portion 50. As best seen in FIG. 2, a pump or vacuum source 56 is connected to the tube 54. The vacuum source 56 is adjustable to permit the level of the vacuum that it draws to set for the particular conveying situation. As the weight of the object being transferred increases and its speed of transfer increases, a greater or stronger vacuum may be required. Applicant has found that a vacuum of two to six inches of Mercury is appropriate for his preferred embodiments.

As best seen in FIG. 1, the perforated continuous conveyor belt 42 has ten rows of perforations extending in the direction of movement of the belt and, as best seen in FIG. 4, there are ten slots 48 formed in the upper plate 47 of the vacuum plenum 44. Each row of perforations formed in the perforated continuous conveyor belt is aligned with one of the slots 48 such that, when there is a vacuum in the vacuum plenum 44, air is being drawn into the plenum 44 through the slots 48 and the aligned row of perforations.

The primary conveyor 12 is adjusted such that its discharge end 18 is at a slightly higher elevation than the upper surface of the perforated continuous conveyor belt 42 to ensure that objects 60 that are discharged from the primary conveyor 12 will be received on the upper surface of the conveyor belt 42.

The operation of the conveyor apparatus is as follows. The drives for the primary 12 and secondary 30 conveyors are turned on and the vacuum source 56 is activated. The objects 60 to be conveyed are fed to the entrance end 16 of the primary conveyor 12. As objects 60 are discharged from the discharge end 18 of the primary conveyor 12, their momentum carries them toward the center area of the secondary conveyor 30. The vacuum source 56 creates a vacuum in the hollow or vacuum plenum 44 which causes atmospheric air to be pulled into the plenum 44 through the slots 48 and the perforations that are passing over the slots 48. The vacuum attracts the objects 60 to the upper surface of the perforated continuous conveyor belt 42 and is of sufficient force to stop their movement in the direction P. Since the perforated conveyor belt 42 is continuously moving in the direction S, the objects abruptly change direction as soon as they are attracted to the surface of the belt 42 by the vacuum. It should be noted that the vacuum plenum 44 is limited to the receiving location of the secondary conveyor 30. By the time the object 60 has moved a slight distance along secondary conveyor 30, its movement relative to the conveyor belt 42 ceases and the object 60 will continue to be conveyed in the direction S toward the discharge end 40 despite the fact that it is no longer attracted to the surface by the vacuum of the vacuum plenum 44.

The following are several examples of the use of applicant's conveyor transfer method and mechanism:

EXAMPLE 1

Paper wrapped candy bars weighing, in the range of, 2 to 4 ounces are deposited on the primary conveyor at a rate up to 380 candy bars per minute. These candy bars are deposited on the primary conveyor with the long dimension of the package traveling parallel to the flow. The packages are cross-transferred onto the continuously moving cross transfer vacuum conveyor at a right angle to its flow, such that the packages are then traveling with their width parallel to the flow and their ends alligned.

EXAMPLE 2

Wrapped burritos weighing about 5½ ounces are deposited on the primary conveyor at a rate up to 300 per minute. The wrapped burritos are deposited on the primary conveyor with their longitudinal dimension traveling parallel to the flow. The wrapped burritos are cross-transferred onto the continuously moving cross transfer vacuum conveyor at a right angle to its flow, such that the packages are now traveling with their width parallel to the flow.

EXAMPLE 3

Soft pack packages of baby wipes, each package weighing about 1½ pounds are deposited on the primary conveyor at a rate up to 180 packages per minute. The soft pack packages are deposited on the primary conveyor with their longitudinal dimension traveling parallel to the flow. The soft pack packages are cross-transferred onto the continuously moving cross transfer vacuum conveyor at a right angle to its flow, such that the packages are now traveling with their width parallel to the flow.

Tests have been run transferring energy bars and candy bars at a rate in excess of 600 bars/minute.

Thus, Applicant's very simple device can change the direction of an object being conveyed without the need for any external guides, rotating mechanism, extending arms, diverting tracks and gates, all of which are costly, require maintenance, can damage the objects being conveyed and are less reliable.

It should be understood that, while certain forms of the present invention have been illustrated and described herein, it is not to be limited to the specific forms or arrangement of parts described and shown.

What is claimed is:

1. A conveyor apparatus including:

a first conveyor for conveying individual objects horizontally in a first direction;

said first conveyor having a discharge end;

a second conveyor for receiving individual objects at a receiving location from said discharge end of the first conveyor and conveying said individual objects in a horizontal direction that is at an angle to said first direction;

said first and second conveyors being arranged with respect to each other such that individual objects reaching the discharge end of said first conveyor are deposited on the receiving location of said second conveyor;

said second conveyor having a flat support surface over which a perforated continuous conveyor belt extends;

said flat support surface having a recess formed therein at said receiving location, said recess being limited to the receiving area;

a hollow vacuum plenum is inlayed into said recess such that the perforations in said perforated continuous conveyor belt are exposed to a vacuum while passing over the hollow vacuum plenum;

a vacuum source connected to said vacuum plenum for creating a vacuum in said vacuum plenum.

2. A conveyor apparatus of the type set forth in claim 1, wherein:

said angle is approximately ninety degrees.

3. A conveyor apparatus of the type set forth in claim 1, wherein:

said first conveyor is supported by a frame and has a flat conveying surface laying in a plane at a predetermined elevation;

said second conveyor is supported by a frame such that its flat support surface lays substantially in the same plane as the flat conveying surface of said first conveyor.

4. A conveyor apparatus of the type set forth in claim 1, wherein:

said first conveyor is supported by a frame and has a flat conveying surface laying in a plane at a predetermined elevation;

said second conveyor is supported by a frame such that its flat support surface is slightly below the plane of the flat conveying surface of said first conveyor.

5. An apparatus for transferring objects weighing one to twenty ounces and moving at a rate up to six hundred units per minute in a first direction along a first conveyor to a second conveyor that is moving in a second direction comprising:

said first conveyor having an entrance end and an exit end;

said second conveyor having a stationary support surface and a belt conveyor moveable over the stationary support surface;

said second conveyor having a receiving location that is located adjacent the exit end of said first conveyor and a discharge end, said belt conveyor moves in a longitudinal direction from the receiving location toward said discharge end such that objects discharged from said first conveyor are received by said second conveyor and conveyed toward its discharge end;

a hollow formed in said stationary support surface at the receiving location; said hollow being limited to said receiving location;

the belt of said second conveyor having rows of perforations formed therein that pass over the hollow formed in the stationary support surface;

a vacuum source of two to six inches of Mercury is connected to said hollow formed in said stationary support surface causing objects that are deposited on said second conveyor to be pulled to the surface of the belt conveyor of the second conveyor thus stopping their movement in said first direction and initiating their movement in said second direction.

6. A conveyor as set forth in claim 5, wherein:

a plate having a plurality of slots formed therein covers said hollow formed in said stationary support, said slots extending longitudinally of said belt conveyor.

7. A conveyor as set forth in claim 6, wherein:

said rows of perforations formed in the second conveyor extending longitudinally thereof; and each slot in said plate underlies a row of perforation in the conveyor belt of said second conveyor.

8. A conveyor for receiving an object at a receiving location while the object is moving in a first direction that is different from the conveying direction of the conveyor, comprising:

said conveyor including a flat stationary support surface;

an open-ended chamber formed in said flat stationary support surface, said open-ended chamber being limited to said receiving location;

an endless belt having a plurality of rows of apertures formed therein, the rows of apertures extend along the length of the endless belt;

drive mechanism causing said endless belt to move in a continuous loop over said flat stationary support surface such that it passes over said open-ended chamber;

a vacuum source in the range of two to six inches of Mercury connected to said open-ended chamber for creating a lower air pressure within said chamber than in the surrounding atmosphere such that the surrounding atmosphere flows through said belt apertures into said chamber and a suction is created along the portion of said belt traveling over said chamber;

the suction functioning to pull and hold objects received by the conveyor to the surface of the endless belt, thus stopping the movement of the object in said first direction and allowing the object to commence movement on said endless belt in the conveying direction of the second conveyor.

* * * * *